US012253960B2

United States Patent
Chang et al.

(10) Patent No.: US 12,253,960 B2
(45) Date of Patent: Mar. 18, 2025

(54) METHOD AND SYSTEM FOR IMPROVING THE EFFICIENCY OF PROTECTING A MULTI-CONTENT PROCESS

(71) Applicant: MEDIATEK Inc., Hsin-Chu (TW)

(72) Inventors: Yu-Tien Chang, Hsinchu (TW); Lin-Ming Hsu, Hsinchu (TW); Chun-Ming Chou, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/225,185

(22) Filed: Apr. 8, 2021

(65) Prior Publication Data

US 2022/0035751 A1 Feb. 3, 2022

Related U.S. Application Data

(60) Provisional application No. 63/057,320, filed on Jul. 28, 2020.

(51) Int. Cl.
*G06F 12/00* (2006.01)
*G06F 12/14* (2006.01)
(Continued)

(52) U.S. Cl.
CPC ...... *G06F 12/1491* (2013.01); *G06F 12/1441* (2013.01); *G06F 12/1466* (2013.01);
(Continued)

(58) Field of Classification Search
CPC .. G06F 12/14; G06F 12/1408; G06F 12/1416; G06F 12/1425; G06F 12/1433;
(Continued)

(56) References Cited

U.S. PATENT DOCUMENTS 9,984,009 B2    5/2018   Ahmed et al.
2010/0030990 A1*  2/2010   Asai ............... G07F 7/1008
                                                    711/115
(Continued)

FOREIGN PATENT DOCUMENTS

CN    107017014 A    8/2017
CN    110704359 A    1/2020
DE    10315763 A1   11/2004

OTHER PUBLICATIONS

CN Office Action dated Dec. 31, 2024 in Chinese application No. 202110459972.7.

*Primary Examiner* — Arvind Talukdar
(74) *Attorney, Agent, or Firm* — McClure, Qualey & Rodack, LLP

(57) ABSTRACT

The invention provides method and system for improving efficiency of protecting multi-content process. The system may cooperate with a memory, and may comprise one or more hardware IPs (intellectual properties) for content processing, one of the one or more IPs may be associated with multiple access identities. The memory may comprise multiple different ranges, each range may register an access of one of the multiple access identities as a permissible access. The method may comprise: selecting one of the access identities for processing a first content, and using the selected access identity when said IP accesses the memory during processing of the first content; selecting a different one of the access identities for processing a second content, and using the selected different access identity when said IP accesses the memory during processing of the second content.

18 Claims, 6 Drawing Sheets

(51) Int. Cl.
*G06F 21/10* (2013.01)
*G06F 21/74* (2013.01)

(52) U.S. Cl.
CPC .............. *G06F 21/10* (2013.01); *G06F 21/74* (2013.01); *G06F 2212/1052* (2013.01); *G06F 2221/2113* (2013.01); *G06F 2221/2141* (2013.01)

(58) Field of Classification Search
CPC .............. G06F 12/1441; G06F 12/145; G06F 12/1458; G06F 12/1466; G06F 12/1475; G06F 12/1483; G06F 12/1491
See application file for complete search history.

(56) References Cited

U.S. PATENT DOCUMENTS

2015/0278119 A1* 10/2015 Loh ...................... G06F 21/575
 713/193
2017/0220489 A1* 8/2017 Ahmed ............... G06F 12/1441
2022/0035953 A1* 2/2022 Mienkina ................ G06F 21/70

\* cited by examiner

US 12,253,960 B2

METHOD AND SYSTEM FOR IMPROVING THE EFFICIENCY OF PROTECTING A MULTI-CONTENT PROCESS

This application claims the benefit of U.S. provisional application Ser. No. 63/057,320, filed Jul. 28, 2020, the subject matter of which is incorporated herein by reference.

FIELD OF THE INVENTION

The invention relates to method and system for improving efficiency of protecting multi-content process, and more particularly, to method and system improving said efficiency by: with each content processing hardware IP (intellectual property) having a plurality of access identities respectively permissible by different ranges of a memory, using different ones of the access identities to access the memory respectively when processing different ones of multiple contents.

BACKGROUND OF THE INVENTION

Various user equipments, including (but not limited to) mobile phones, smart phones, notebook computers, tablet computers, telematics devices, game consoles, set-top boxes, wearable gadgets, smart speakers and televisions, etc., have become essential in modern daily life, and are frequently utilized to handle (e.g., process) normal contents and secure contents. The secure contents may include (but not be limited to) licensed, copyrighted, paid, DRM-protected (with DRM being digital rights management) software, articles, documents, photos, images, media streams, audio and video; and may also include keys and credentials for encryption and/or decryption, digital signature, digital certificate and digital authentication; and may further include personal, private, confidential, sensitive and/or critical information such as PII (personally identifiable information), digitized biometric features and trade secrets, etc. The normal contents may be non-secure contents which are not secure contents.

A UE (user equipment) includes a memory and one or more hardware IPs. A subset (one or some) of the IPs may be processor IP(s) for implementing a secure CPU (central processing unit) and a non-secure CPU, and rest of the IPs may be peripheral IP(s) for performing specific hardware operations, such as data encrypting and/or decrypting, media encoding and/or decoding, video/audio demultiplexing and/or multiplexing, etc. The memory may have several ranges, including secure ranges and non-secure ranges. By accessing the non-secure ranges of the memory, the non-secure CPU runs a non-trusted OS (operating system) to form a non-trusted execution environment which allows execution of non-trusted programs (apps). By accessing the secure ranges (and the non-secure ranges if necessary) of the memory, the secure CPU runs a trusted OS to form a trusted execution environment which allows execution of trusted programs (apps). Normally, a UE works in the non-trusted execution environment, and leverages the trusted execution environment when secure contents are involved. One, some or all of the hardware IPs may cooperate with the secure CPU and one or more ranges of the memory to form a secure content path to process a secure content, e.g., to form an SMP (secure media path) to process a secure media content (e.g., to decrypt and decode a protected video media content to retrieve clear frames and/or audio tracks). On the other hand, one, some or all of the hardware IPs may cooperate with the non-secure CPU and one or more ranges of the memory to form a non-secure content path to process a non-secure content (e.g., DRM-free media content).

For demands of multitasking, a modern UE needs to satisfy coexisting requests to process multiple contents, e.g., requests to concurrently display several media contents in several coexisting windows, respectively. In response to such requests, the UE forms multiple content paths and switches between the multiple content paths to process the multiple contents. When the UE organizes the multiple content paths to implement a multi-content process for processing multiple contents, because one, some or all of the multiple contents may be secure content(s), the UE must also protect the multi-content process; for example, the UE needs to maintain memory isolation between content paths processing different contents, such that a first content processed by a first content path will not be exposed to a second content path which processes a second content, and the second content will not be exposed to the first content path. As the multiple content paths includes secure content path(s) involving the secure CPU and non-secure path(s) involving the non-secure CPU, the UE must frequently switch between the non-secure CPU and the secure CPU to satisfy coexisting requests to process the multiple contents. However, conventional ways of organizing the secure content paths and the non-secure content paths will cause communication overhead between the non-secure CPU and the secure CPU.

SUMMARY OF THE INVENTION

An objective of the invention is providing a method (e.g., 300 in FIG. 1b or 1c) applied to a system (e.g., 200 in FIG. 1a) for improving efficiency of protecting multi-content process. The system may cooperate with a memory (e.g., 220 in FIG. 1a), and may comprise one or more hardware IPs (e.g., ip[1] to ip[N] in FIG. 1a) for content processing. One (e.g., ip[n] in FIG. 1a, anyone of ip[1] to ip[3] in FIG. 1c, ip[a1] or ip[n5] in FIG. 2a, ip[n5'] in FIG. 2b, ip[n6] in FIG. 3 or ip[n7] in FIG. 4) of the one or more IPs may be associated with multiple access identities (e.g., aid[n]_1 to aid[n]_K in FIG. 1a, aid[1]_1 to aid[1]_2, aid[2]_1 to aid[2]_2 or aid[3]_1 to aid[3]_2 in FIG. 1c). The memory may comprise multiple different ranges (e.g., sr1 to sr4 in FIG. 1c), each said range may be configurable to register an access of one of the multiple access identities as a permissible access (e.g., 301 in FIG. 1c, wherein a range sr1 may register write of the access identity aid[1]_1 as permissible, and a range sr3 may register write of the access identity aid[1]_2 as permissible). The method may comprise: selecting one of the multiple access identities for processing a first content (e.g., 303 in FIG. 1b or 1c), and using the selected access identity when said IP accesses the memory during processing of the first content (e.g., 305 in FIG. 1b or 1c); and selecting a different one of the multiple access identities for processing a second content (e.g., 307 in FIG. 1b or 1c), and using the selected different access identity when said IP accesses the memory during processing of the second content (e.g., 309 in FIG. 1b or 1c).

In an embodiment, the method may further comprise: between processing of the first content and the second content (e.g., 305 and 309 in FIG. 1b or 1c), not reconfiguring registered permissible access(es) of each said range.

In an embodiment, the method may further comprise: when selecting one of the multiple access identities, determining which one to select by a non-secure CPU (e.g., 240 in FIG. 1a).

In an embodiment (e.g., FIG. 1b or 1c), each said range may be configured by a secure CPU (e.g., 230 in FIG. 1a)

to register an access of one of the multiple access identities as a permissible access (e.g., 301 in FIG. 1b or 1c).

In an embodiment (e.g., FIG. 2a), the one or more IPs may further include a preceding IP (e.g., ip[a1] in FIG. 2a) coupled to said IP (e.g., ip[n5] in FIG. 2a). The preceding IP may be associated with multiple preceding-IP access identities (e.g., aid[a1]_1 to aid[a1]_K), and may select one of the multiple preceding-IP access identities. Each said access identity (e.g., aid[n5]_k) may be bound to one (e.g., aid[a1]_q) of the multiple preceding-IP access identities. The method may further comprise: when selecting one of the multiple access identities, selecting a said access identity that is bound to the selected preceding-IP access identity. In an embodiment, selecting the said access identity that is bound to the selected preceding-IP access identity may be performed without intervention of the secure CPU, and regardless of whether and how the non-secure CPU instructs.

In an embodiment (e.g., FIG. 2b), the one or more IPs may further include a succeeding IP (e.g., ip[b1] in FIG. 2b) coupled to said IP (e.g., ip[n5'] in FIG. 2b), and the method may further comprise: when one (e.g., aid[n5']_k) of the multiple access identities is selected, propagating the selected access identity to the succeeding IP, and using the selected access identity when the succeeding IP accesses the memory.

In an embodiment (e.g., FIG. 3), the one or more IPs may further include a plurality of preceding IPs (e.g., ip[c1] to ip[c2] in FIG. 3) coupled to said IP (e.g., ip[n6] in FIG. 3). Each access identity (e.g., aid[n6]_k) of said IP may be associated with one of a plurality of security levels (e.g., L[1] to L[M]).

Each said preceding IP may be associated with multiple corresponding access identities, and may select one of the multiple corresponding access identities; each said corresponding access identity may be associated with one of said plurality of security levels. The method may further comprise: when selecting one of the multiple access identities (e.g., aid[n6]_1 to aid[n6]_K), as the preceding IPs (e.g., ip[c1] to ip[c2]) select the corresponding access identities (e.g., aid[c1]_k1 to aid[c2]_k2) associated with the security levels (e.g., L[m1] to L[m2]) respectively, selecting a said access identity (e.g., aid[n6_k3]) according to the security levels (e.g., L[m1] to L[m2]) associated with the selected corresponding access identities (e.g., aid[c1]_k1 to aid[c2]_k2) of the plurality of preceding IPs. In an embodiment, the method may further comprise: when selecting one of the multiple access identities, applying a predefined rule to the security levels (e.g., L[m1] to L[m2]) associated with the selected corresponding access identities of the plurality of preceding IPs to evaluate a resultant security level, and selecting a said access identity that is associated with the resultant security level.

In an embodiment (e.g., FIG. 4), each said access identity may be associated with one of a plurality of security levels, the first content may be associated with one of the plurality of security levels, and the method may further comprise: when selecting one of the multiple access identities for processing the first content, selecting a said access identity according to the security level associated with the first content. In an embodiment, the method may further comprise: when selecting one of the multiple access identities for processing the first content, selecting a said access identity that is associated with a said security level equal to the security level associated with the first content.

An objectivity of the invention is providing a system (e.g., 200 in FIG. 1a) with improved efficiency of protecting multi-content process. The system may comprise one or more hardware IPs (e.g., ip[1] to ip[N] in FIG. 1a) for content processing; a subset of the one or more hardware IPs may implement a secure CPU (e.g., 230) and a non-secure CPU (e.g., 240). The system may cooperate with a memory (e.g., 220) which may comprise multiple different ranges (e.g., sr1 to sr4 in FIG. 1c). One (e.g., ip[n] in FIG. 1a, anyone of ip[1] to ip[3] in FIG. 1c, ip[a1] or ip[n5] in FIG. 2a, ip[n5'] in FIG. 2b, ip[n6] in FIG. 3 or ip[n7] in FIG. 4) of one or more IPs may be associated with multiple access identities (e.g., aid[n]_1 to aid[n]_K in FIG. 1a). The secure CPU may be arranged to: in response to coexisting requests to process a first content and a second content, configure the multiple ranges of the memory such that each of the multiple ranges may register an access of one of the multiple access identities as a permissible access. Said IP may be arranged to: select one of the multiple access identities for processing the first content, and use the selected access identity when accessing the memory to process the first content; and select a different one of the multiple access identities for processing the second content, and use the selected different access identity when accessing the memory to process the second content.

In an embodiment, the secure CPU may be further arranged not to reconfigure the registered permissible access of each said range between processing of the first content and the second content.

In an embodiment (e.g., FIG. 1c), the non-secure CPU may be arranged to: instruct said IP (e.g., ip[2] in FIG. 1c) which one of the multiple access identities to select when said IP selects one of the multiple access identities.

In an essential embodiment (e.g., FIG. 2a), the one or more IPs may further include a preceding IP (e.g., ip[a1] in FIG. 2a) coupled to said IP (e.g., ip[n5] in FIG. 2a). The preceding IP may be associated with multiple preceding-IP access identities (e.g., aid[a1]_1 to aid[a1]_K), and may be arranged to select one of the multiple preceding-IP access identities. Each said access identity (e.g., aid[n5]_k) is bound to one (e.g., aid[a1]_q) of the multiple preceding-IP access identities. Said IP (e.g., ip[n5]) may be further arranged to: when selecting one of the multiple access identities, select a said access identity that is bound to the selected preceding-IP access identity. In an embodiment, said IP may be further arranged to: when selecting one of the multiple access identities, determine which one to select without intervention of the secure CPU, and regardless of whether and how the non-secure CPU instructs.

In an embodiment (e.g., FIG. 2b), the system may further comprise an internal link (500b), the one or more IPs may further include a succeeding IP (e.g., ip[b1]) coupled to said IP (e.g., ip[n5']) via the internal link. The internal link may be arranged to: when said IP selects one of the multiple access identities, propagate the selected access identity to the succeeding IP. The succeeding IP may be arranged to use the selected access identity when the succeeding IP accesses the memory.

In an embodiment (e.g., FIG. 3), the one or more IPs may further include a plurality of preceding IPs (e.g., ip[c1] to ip[c2] in FIG. 3) coupled to said IP (e.g., ip[n6] in FIG. 3). Each said access identity may be associated with one of a plurality of security levels (e.g., L[1] to L[M]). Each said preceding IP may be associated with multiple corresponding access identities, and may be arranged to select one of the multiple corresponding access identities; each of the multiple corresponding access identities may be associated with one of the plurality of security levels. Said IP may be further arranged to: when selecting one of the multiple access identities, select a said access identity according to the security levels (e.g., L[m1] to L[m2]) associated with the selected corresponding access identities (e.g., aid[c1]_k1 to aid[c2]_k2) of the plurality of preceding IPs. In an embodiment, said IP may be further arranged to: when selecting one of the multiple access identities, apply a predefined rule to the security levels (e.g., L[m1] to L[m2]) associated with the selected corresponding access identities of the plurality of preceding IPs to evaluate a resultant security level, and select a said access identity that is associated with the resultant security level. In an embodiment, said IP may be further arranged to: when selecting one of the multiple access identities, determine which one to select without intervention of the secure CPU, and regardless of whether and how the non-secure CPU instructs.

In an embodiment (e.g., FIG. 4), each said access identity may be associated with one of a plurality of security levels, the first content may be associated with one of the plurality of security levels, and said IP (e.g., ip[n7] in FIG. 4) may be further arranged to: when selecting one of the multiple access identities for processing the first content, select a said access identity according to the security level associated with the first content. In an embodiment, said IP may be further arranged to: when selecting one of the multiple access identities for processing the first content, select a said access identity that is associated with a said security level equal to the security level associated with the first content.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
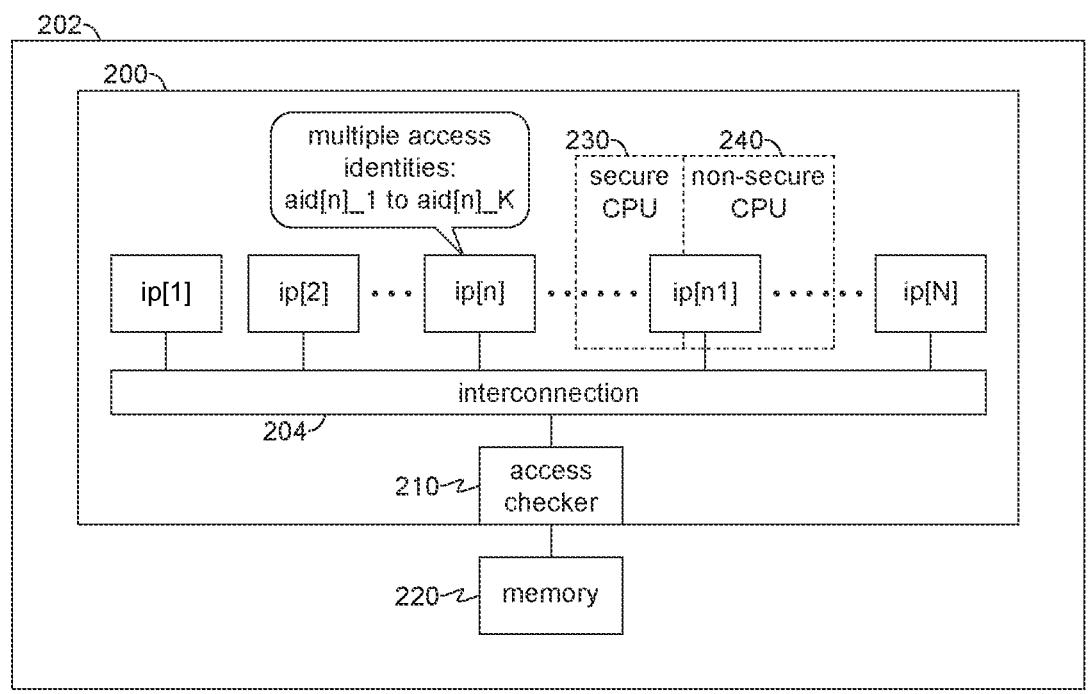
FIG. 1a depicts a system according to an embodiment of the invention.

FIG. 1a depicts a hardware system 200 according to an embodiment of the invention. The system 200 may be disposed in a UE 202, and may include an interconnection 204, an access checker 210 and a number N (one or more) of hardware IPs ip[1] to ip[N] for content processing. The interconnection 204 may be one or more buses, the IPs ip[1] to ip[N] may be coupled to the interconnection 204, and the access checker 210 may be coupled between the interconnection 204 and memory 220. A subset (one or some) of the IPs ip[1] to ip[N], such as ip[n1] or more, may be processor IP(s) to implement a secure CPU 230 and a non-secure CPU 240, while rest of the IPs ip[1] to ip[N] may be peripheral IP(s) for specific hardware operations, such as data encrypting and/or decrypting, media encoding and/or decoding, video/audio demultiplexing and/or multiplexing, signal processing, graphic (image and/or video) processing, deep leaning model training and/or execution, etc.

In an embodiment, the processor IP(s) may provide two different hardware circuits to respectively implement the secure CPU 230 and the non-secure CPU 240; in a different embodiment, the processor IP(s) may provide a common hardware circuit which switches to operate between a secure state and a non-secure state to function as the secure CPU 230 and the non-secure CPU 240.

In an embodiment, the system 200 may be integrated in a semiconductor chip (e.g., SoC, silicon on chip), and the memory 220 may be an external DRAM (dynamic random access memory) formed by one or more memory dices. The memory 220 may have one or more ranges (not shown in FIG. 1a), including one or more secure ranges and one or more non-secure ranges. By accessing the non-secure range(s) of the memory 220, the non-secure CPU 240 may run a non-trusted OS (not shown) to form a non-trusted execution environment which allows execution of non-trusted programs (apps, not shown). By accessing the secure ranges (and the non-secure ranges if necessary) of the memory 220, the secure CPU 230 may run a trusted OS (not shown) to form a trusted execution environment which allows execution of trusted programs (apps, not shown). Normally, the system 200 may work in the non-trusted execution environment, and may leverage the trusted execution environment when secure contents are involved. One, some or all of the IPs ip[1] to ip[N] may cooperate with one or more ranges of the memory 220 to form a content path to process a content; e.g., to form an SMP to process a secure media content (e.g., to decrypt and decode a protected video content to retrieve clear frames and/or audio tracks).

According to the invention, each IP ip[n] (for n=1 to N) may be associated with a number K (more than one) access identities aid[n]_1 to aid[n]_K. Each IP ip[n] may select one of the access identities aid[n]_1 to aid[n]_K, and use the selected access identity to access an address of the memory 220 via the access checker 210, and the access checker 210 may determine whether to permit the access according to whether the address is in a range which registers an access of the selected access identity as a permissible access. For example, the IP ip[n] may select to use an access identity aid[n]_k1 (for k1 being one of 1 to K) to read an address of the memory 220; in response, the access checker 210 may permit the read if the address is in a range which already registers read of the access identity aid[n]_k1 as a permissible access, and may deny the read if the address is in a range which registers read of the access identity aid[n]_k1 as an impermissible access (or a range which does not register read of the access identity aid[n]_k1 as a permissible access). For security and content protection, permissions (registered permissible and impermissible accesses) of a secure range can only be configured by the secure CPU 230. By accessing the memory 220, each IP ip[n] may obtain (fetch or extract, etc.) data to be processed, buffer data under processing, and/or store processed data.

Figure 1B:
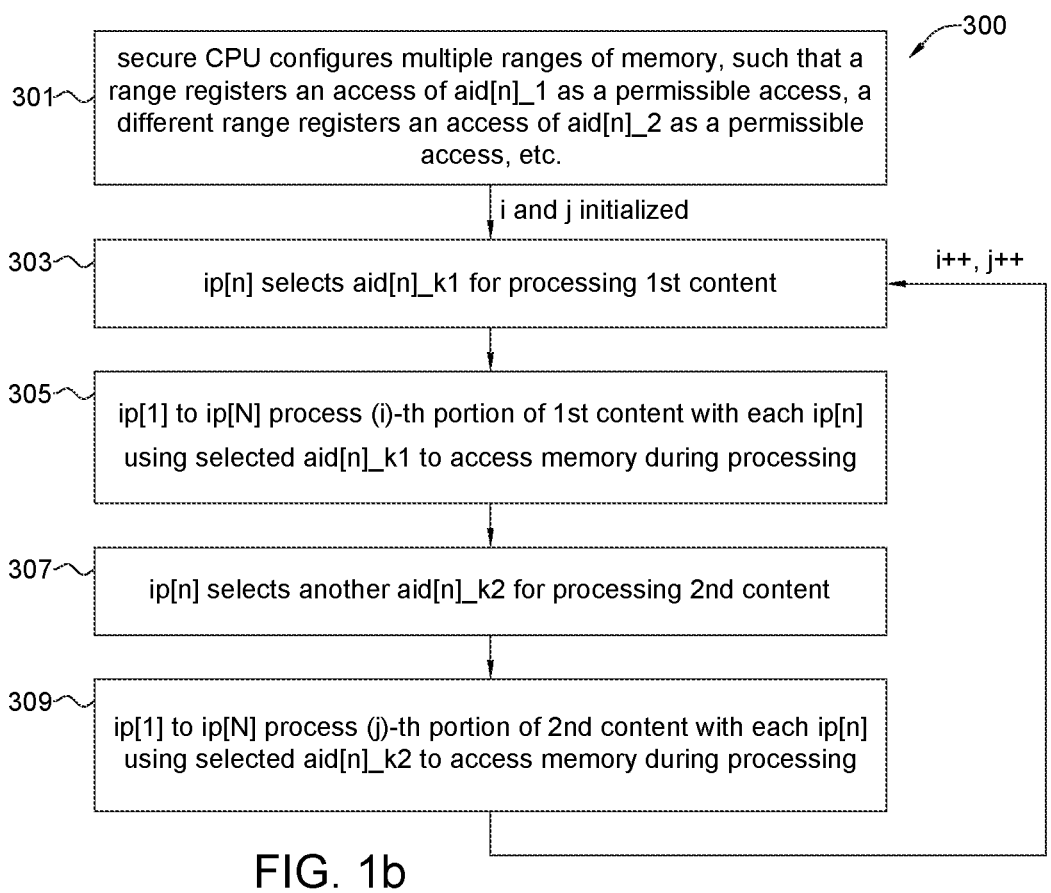
FIG. 1b depicts a flowchart according to an embodiment of the invention, which may be applied to the system in FIG. 1a for protecting multi-content process.

Along with FIG. 1a, FIG. 1b depicts a flowchart 300 according to an embodiment of the invention. When there are several coexisting requests to process several contents (e.g., when the UE 202 is requested to simultaneously display several media streams in several coexisting windows), the system 200 (FIG. 1a) may adopt the flowchart 300 to protect multi-content process. For conciseness and convenience of explanation, it is assumed that there are two coexisting requests to process two contents: a first content and a second content.

As shown in FIG. 1b, at step 301, in response to the coexisting requests of processing the first content and the second content, the secure CPU 230 may configure multiple different ranges of the memory 220, such that each of the multiple ranges may register an access (read and/or write) of an access identity aid[n]_k as a permissible access. For example, a first one of the multiple ranges may register an access of the access identity aid[n]_1 as permissible, a second one of the multiple ranges may register an access of the access identity aid[n]_2 as permissible, etc.

At step 303, in order to process the first content, each IP ip[n] may select an access identity aid[n]_k1 (with k1 being one of 1 to K).

At step 305, the IPs ip[1] to ip[N] may process an (i)-th portion of the first content, wherein each IP ip[n] may use the selected access identity aid[n]_k1 when accessing the memory 220 during processing. After the (i)-th portion of the first content is processed, the flowchart 300 may continue to step 307.

At step 307, in order to process the second content, each IP ip[n] may select another access identity aid[n]_k2 (with k2 being one of 1 to K but not equal to k1).

At step 309, the IPs ip[1] to ip[N] may process a (j)-th portion of the second content, wherein each IP ip[n] may use the selected access identity aid[n]_k2 when accessing the memory 220 during processing. After the (j)-th portion of the second content is processed, the flowchart 300 may iterate back to step 303 to start another cycle of steps 303, 305, 307 and 309 for processing other portions of the first content and the second content.

Figure 1C:
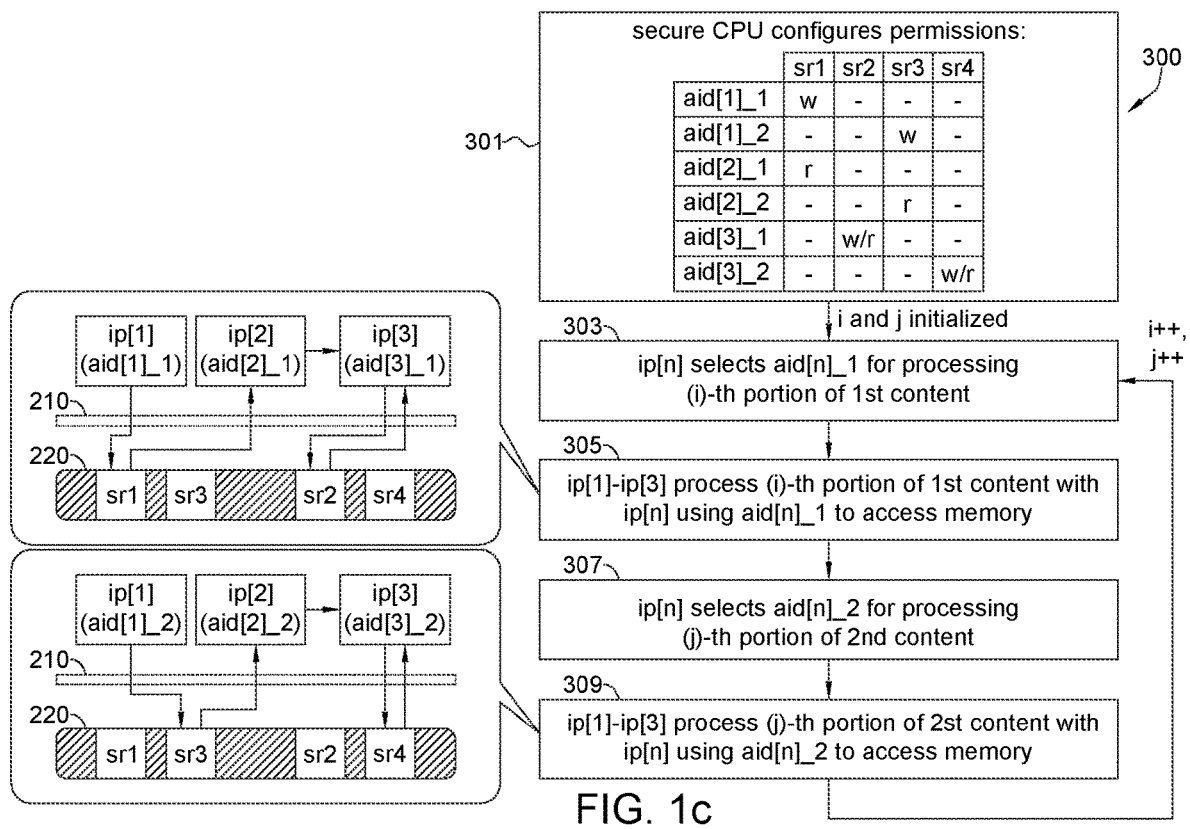
FIG. 1c depicts an example of the flowchart shown in FIG. 1b.

Along with FIGS. 1a and 1b, FIG. 1c depicts an example of applying the flowchart 300 to three IPs ip[1] to ip[3], wherein each IP ip[n] (for n=1 to 3) may be associated with two access identities aid[n]_1 and aid[n]_2. As shown in FIG. 1c, at step 301, the secure CPU 230 (FIG. 1a) may configure ranges sr1 to s4 of the memory 220, such that: the range sr1 may register write of the access identity aid[1]_1 and read of the access identity aid[2]_1 as permissible, and may register any access (either read or write) of other access identities aid[1]_2, aid[2]_2, aid[3]_1 and aid[3]_2 as impermissible; the range sr2 may register read and write of the access identity aid[3]_1 as permissible, and may register any access of other access identities aid[1]_1, aid[1]_2, aid[2]_, aid[2]_2 and aid[3]_2 as impermissible; the range sr3 may register write of the access identity aid[1]_2 and read of the access identity aid[2]_2 as permissible, and may register any access of other access identities aid[1]_1, aid [2]_1, aid[3]_1 and aid[3]_2 as impermissible; and the range sr4 may register read and write of the access identity aid[3]_2 as permissible, and may register any access of other access identities aid[1]_1, aid[1]_2, aid[2]_1, aid[2]_2 and aid[3]_1 as impermissible. It is noted that, though the two access identities aid[n]_1 and aid[n]_2 are associated with the same IP ip[n], configuration of the secure CPU 230 may arrange them to be permissible in two different ranges, rather than a same range. There may not be any range which permits different access identities aid[n]_1 to aid[n]_K of a same IP ip[n]. For example, as shown FIG. 1c, while the access identities aid[1]_1 and aid[1]_2 are associated with the same IP ip[1], they may be respectively permissible in two different ranges sr1 and sr3. In general, for two different access identities aid[n]_k1 and aid[n]_k2 of a same IP ip[n], the access identity aid[n]_k2 may be impermissible in a range which permits access of the access identity aid[n]_k1, and the access identity aid[n]_k1 may be impermissible in a different range which permits access of the access identity aid[n]_k2.

At step 303, to process the (i)-th portion of the first content, the IPs ip[1], ip[2] and ip[3] may respectively select the access identities aid[1]_1, aid[2]_ and aid[3]_1.

At step 305, the IPs ip[1], ip[2] and ip[3] may process the (i)-th portion of the first content. During processing, the IPs ip[1], ip[2] and ip[3] may respectively use the selected access identities aid[1]_1, aid[2]_1 and aid[3]_1 when accessing the memory 220. Since write of the access identity aid[1]L and read of the access identity aid[2]_1 are permissible in the range sr1, write and read of the access identity aid[3]_1 are permissible in the range sr2, the IPs ip1[1] to ip[3] may cooperate with the ranges sr1 and sr2 to form a first content path (e.g., SMP) to process the first content. As an example, the IP ip[1] may obtain data (e.g., extract encrypted and encoded video frames and/or audio tracks) from the (i)-th portion of the first content, and use the access identity aid[1]_1 to write the obtained data to the range sr1; the IP ip[2] may use the access identity aid[2]_1 to read data from the range sr1, perform operation(s) on the read data (e.g., decrypt and decode encrypted and encoded video frames and/or audio tracks) to retrieve clear video frames and/or audio tracks) and output resultant data to the IP ip[3], then the IP ip[3] may use the access identity aid[3]_1 to read and write the range sr2 when the IP ip[3] performs further operation(s) on the data from the IP ip[2] (e.g., performs image enhancing, color adjusting and/or audio equalization, etc.).

At step 307, to process the (j)-th portion of the first content, the IPs ip[1], ip[2] and ip[3] may respectively select the access identities aid[1]_, aid[2]_2 and aid[3]_2.

At step 309, the IPs ip[1], ip[2] and ip[3] may process the (j)-th portion of the second content. During processing, the IPs ip[1], ip[2] and ip[3] may respectively use the access identities aid[1]_2, aid[2]_2 and aid[3]_2 when accessing the memory 220. As write of the access identity aid[1]_2 and read of the access identity aid[2]_2 are permissible in the range sr3, write and read of the access identity aid[3]_2 are permissible in the range sr4, the IPs ip[1] to ip[3] may cooperate with the ranges sr3 and sr4 to form a second content path to process the second content.

Since the first content path (step 305) and the second content path (step 309) may utilize different ranges of the memory 220, the flowchart 300 may achieve memory isolation between processing of the first content and the second content. According to the invention, because each IP ip[n] has multiple access identities aid[n]_1 to aid[n]_K, the flowchart 300 may only need the secure CPU 230 to configure range permissions once (at step 301) with different access identities aid[n]_k1 and aid[n]_k2 of the same IP ip[n] being respectively permissible in different ranges, then the flowchart 300 may achieve memory isolation between processing of different contents (steps 305 and 309) by selecting between different access identities aid[n]_ and aid[n]_k2 of each IP ip[n] (steps 303 and 307). The flowchart 300 may therefore not need the secure CPU 230 to repeatedly reconfigure range permissions between processing of different contents. In other words, the range permissions configured at step 301 may remain unchanged when cycling steps 303, 305, 307 and 309. Hence, the flowchart 300 according to the invention may improve efficiency of protecting multi-content process.

Selecting access identities at steps 303 and 307 may not involve the secure CPU 230. For steps 303 and 307, each IP ip[n] may have its own identity decision mechanism to determine which one of the access identities aid[n]_1 to aid[n]_K to select, and the identity decision mechanism may not need the secure CPU 230 to intervene. Different ones of the IP ip[1] to ip[N] may adopt different identity decision mechanisms or a same identity decision mechanism.

In an embodiment, an IP ip[n2] (for n2 being one of 1 to N, not shown) of the IPs ip[1] to ip[N] may adopt a non-secure CPU instructed identity decision mechanism. As the IP ip[n2] may be associated with access identities aid[n2]_1 to aid[n2]_K, which one of the access identities aid[n2]_1 to aid[n2]_K should be selected at step 303/307 for processing the first/second content at step 305/309 may be determined by the non-secure CPU 240; e.g., the non-secure CPU 240 may determine and instruct the IP ip[n2] which one of the access identities aid[n2]_1 to aid[n2]_K to select at steps 303 and 307. In an embodiment, the IP ip[n2] may be an IP which reads the memory 220 (FIG. 1a) to obtain the data to be processed by the IP ip[n2]. For example, the IP ip[2] in FIG. 1c may adopt the non-secure CPU instructed identity decision mechanism: the non-secure CPU 240 may instruct the IP ip[2] to select the access identity aid[2]_1 at step 303 for processing the first content, and to select the access identity aid[2]_2 at step 307 for processing the second content. Similarly, the IP ip[1] in FIG. 1c may also adopt the non-secure CPU instructed identity decision mechanism. As the flowchart 300 (FIG. 1b or 1c) cycles between processing of the first content (step 305) and the second content (step 309), the non-secure CPU 240 may repeatedly instruct the IP ip[n2] to switch between different two of the access identities aid[n2]_1 to aid[n2]_K (steps 303 and 307).

Though it is possible to compromise the non-secure CPU 240 so the compromised non-secure CPU 240 might maliciously instruct the IP ip[n2] to select a wrong one of the access identities aid[n2]_1 to aid[n2]_K, the malicious instruction could only sabotage content process, but will not breach content protection. For example, in FIG. 1c, after step 305 during which the IP ip[1] uses the access identity aid[1]L to write data of the first content to the range sr1, it is possible that the non-secure CPU 240 tries to expose the range sr1 to the second content path formed at step 309 by maliciously instructing the IP ip[2] to select the wrong access identity aid[2]_1 (instead of aid[2]_2) at step 307 (with the IP ip[1] selecting the access identity aid[1]_2), since the range sr1 permits read of the access identity aid[2]_1. However, because the range sr1 may be a secure range as configured by the secure CPU 230 at step 301, the non-secure CPU 240 still cannot access the range sr1, and content protection may therefore remain intact, though the second content path at step 309 may not function as expected since the IP ip[2] cannot read data of the second content from the correct range sr3 by the wrong access identity aid[2]_1.

Along with FIGS. 1a to 1c, FIG. 2a depicts two IPs ip[a1] and ip[n5] of the IPs ip[1] to ip[N] (FIG. 1a) according to an embodiment of the invention (with a1 and n5 being different two of 1 to N). The IP ip[n5] may be coupled to the IP ip[a1] via an internal link (e.g., bus) 500a; data to be processed by the IP ip[n5] may be generated by the IP ip[a1], and may be sent to the IP ip[n5] from the IP ip[a1] via the link 500a, rather than via the memory 220 (FIG. 1a). Under such link arrangement, the IP ip[n5] may adopt a binding identity decision mechanism. As the IP ip[n5] may be associated with access identities aid[n5]_1 to aid[n5]_K and the IP ip[a1] may be associated with access identities aid[a1]_1 to aid[a1]_K, there may be a preset binding relation which binds each access identity aid[n5]_k (for k=1 to K) to one of the access identities aid[a1]_1 to aid[a1]_K; e.g., each access identity aid[n5]_k may be bound to an access identity aid[a1]_q (with q being one of 1 to K). At step 303/307, when the IP ip[a1] selects an access identity aid[a1]_q (with q being one of 1 to K), the link 500a may inform the IP ip[n5] about the selected access identity aid[a1]_q of the IP ip[a1], and the IP ip[n5] may then select an access identity aid[n5]_k that is bound to the selected access identity aid[a1]_q of the IP ip[a1]. In an embodiment, the binding identity decision mechanism may be implemented by the IP ip[n5] itself in cooperation with the link 500a and the IP ip[a1], so the IP ip[n5] may select its own access identity at step 303/307 without intervention of the secure CPU 230 (FIG. 1a), and regardless of whether and how the non-secure CPU 240 instructs.

Figure 2A:
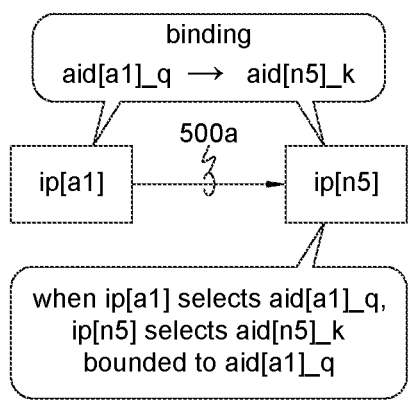
FIGS. 2a, 2b, 3 and 4 depicts IPs according to embodiments of the invention.

In the example shown in FIG. 1c, the IP ip[3] may obtain data to be processed from the IP ip[2] via an internal link, so a link arrangement between the IPs ip[2] and ip[3] is similar to the link arrangement between the IPs ip[a1] and ip[n5] shown in FIG. 2a. Thus, similar to the IP ip[n5] in FIG. 2a, the IP ip[3] in FIG. 1c may adopt the binding identity decision mechanism. For example, the access identities aid[3]_ and aid[3]_2 of the IP ip[3] may be respectively bound to the access identities aid[2]_1 and aid[2]_2 of the IP ip[2]; at step 303, the IP ip[2] selects the access identity aid[2]_1, so the IP ip[3] may select the access identity aid[3]_1 bound to the access identity aid[2]_1; at step 307, the IP ip[2] selects the access identity aid[2]_2, so the IP ip[3] may select the access identity aid[3]_2 bound to the access identity aid[2]_2.

Along with FIGS. 1a to 1c, FIG. 2b depicts two IPs ip[n5'] and ip[b1] of the IPs ip[1] to ip[N] (FIG. 1a) according to an embodiment of the invention (with n5' and b1 being different two of 1 to N). The IP ip[b1] may be coupled to the IP ip[n5'] via an internal link (e.g., bus) 500b; data to be processed by the IP ip[b1] may result from the IP ip[n5'], and may be sent to the IP ip[b1] from the IP ip[n5'] via the link 500b, rather than via the memory 220 (FIG. 1a). Under such link arrangement, the IP ip[b1] may adopt a propagation identity decision mechanism: as the IP ip[n5'] may be associated with access identities aid[n5']_1 to aid[n5']_K, at step 303/307, when the IP ip[n5'] selects an access identity aid[n5']_k (with k being one of 1 to K), the link 500b may propagate the selected access identity aid[n5']_k to the IP ip[b1], and the IP ip[b1] may use the access identity aid [n5']_k of the IP ip[n5'] as its own access identity when the IP ip[b1] accesses the memory 220 at step 305/309. In an embodiment, the propagation identity decision mechanism may be implemented by the IP ip[b1] in cooperation of the link 500b and the ip[n5'], so the IP ip[b1] may determine an access identity at step 303/307 without intervention of the secure CPU 230, and regardless of whether and how the non-secure CPU 240 instructs.

Figure 2B:
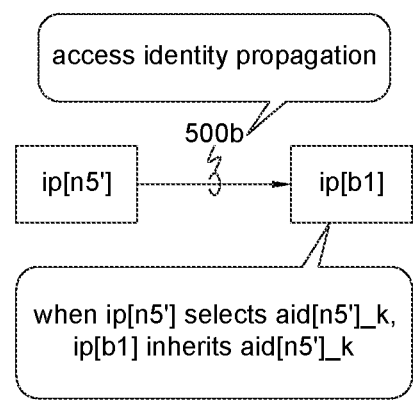

In the example shown in FIG. 1c, the IP ip[3] may obtain data to be processed from the IP ip[2] via an internal link, so a link arrangement between the IPs ip[2] and ip[3] is similar to the link arrangement between the IPs ip[n5'] and ip[b1] shown in FIG. 2b. Thus, similar to the IP ip[b1] in FIG. 2b, the IP ip[3] in FIG. 1c may adopt the propagation identity decision mechanism: at step 303, when the IP ip[2] selects the access identity aid[2]_1, the link 500b may propagate the access identity aid[2]_1 to the IP ip[3], so the IP ip[3] may inherit the access identity aid[2]_1 as the access identity aid[3]_1, and may use the access identity aid[2]_1 when the IP ip[3] accesses the memory 220 at step 305; at step 307, when the IP ip[2] selects the access identity aid[2]_2, the link 500b may propagate the selected access identity aid[2]_2 to the IP ip[3], so the IP ip[3] may inherit the access identity aid[2]_2 as the access identity aid[3]_2, and may use the access identity aid[2]_2 when the IP ip[3] accesses the memory 220 at step 309. To adopt the propagation identity decision mechanism, at step 301 (FIG. 1c), the secure CPU 230 may configure the range sr2 to register read and write of the access identity aid[2]_1 as permissible, and configure the range sr4 to register read and write of the access identity aid[2]_2 as permissible.

Figure 3:
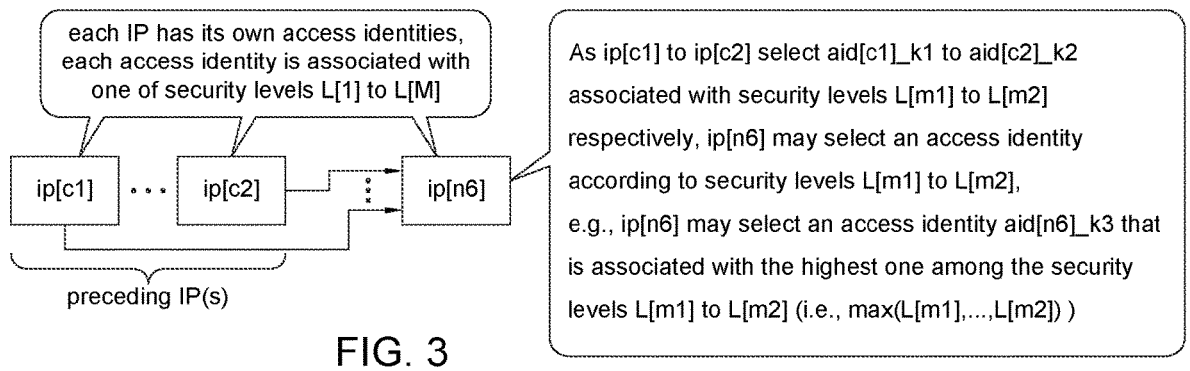

Along with FIGS. 1a and 1b, FIG. 3 depicts an IP ip[n6] of the IPs ip[1] to ip[N] (FIG. 1a) according to an embodiment of the invention (with n6 being one of 1 to N). The IP ip[n6] may be coupled to one or more other IPs ip[c1] to ip[c2] of the ip[1] to ip[N] via one or more internal links; for the IP ip[n6], said one or more other IPs ip[c1] to ip[c2] may be regarded as preceding IP(s), may jointly generate data to be processed by the IP ip[n6], and may send the generated data to the IP ip[n6] via the internal link(s). Under such link arrangement, the IP ip[n6] may adopt a secure priority identity decision mechanism described below. Each IP ip[c] of the preceding IPs ip[c1] to ip[c2] may be associated with access identities aid[c]_1 to aid[c]_K, and the IP ip[n6] may be associated with access identities aid[n6]_1 to aid[n6]_K; besides, each of the access identities aid[c1] Lk to aid[c2]_k and aid[n6]_k (for k=1 to K) may further be associated with one of a plurality of security levels L[1] to L[M].

At step 303/307 (FIG. 1b), if the preceding IP(s) ip[c1] to ip[c2] select the access identities aid[c1]_k1 to aid[c2]_k2 associated with the security levels L[m1] to L[m2] respectively, then the IP ip[n6] may select one of the secure access identities aid[n6]_1 to aid[n6]_K according to the security levels L[m1] to L[m2] associated with the selected access identities aid[c1]_k1 to aid[c2]_k2 of the preceding IPs ip[c1] to ip[c2]. For example, the IP ip[n6] may apply a predefined rule to the security levels L[m1] to L[m2] associated with the selected access identities aid[c1]_k1 to aid[c2]_k2 to evaluate a resultant security level L[m3] (not shown), and select an access identity aid[n6]_k3 that is associated with the resultant security level L[m3]. For example, the IP ip[n6] may apply a maximum-finding rule to the security levels L[m1] to L[m2] to identify a highest security level L[m3] among the security levels L[m1] to L[m2](i.e., L[m3]=max(L[m1], . . . , L[m2])), and then select an access identity aid[n6]_k3 that is associated with the identified highest security level L[m3].

As an example, in an embodiment, the IP ip[c1], which may be a video module for processing protected video content, may select an access identity aid[c1]L2 associated with a high security level L[2] to access the memory 220 for processing a secure media content to retrieve a clear frame to be displayed in a window; the IP ip[c2], which may be a window manager, may select an access identity id[c2]_1 associated with a low security level L[1] (L[1]<L[2]) to access the memory 220 for generating a normal image of a dropdown menu; and the IP ip[n6], which may be an image mixer, may then select the secure access identity id[n6]_2 that is associated with the highest security level L[2] to access the memory 220 for overlaying the dropdown menu over the clear frame, so the clear frame of the secure content may remain protected.

In an embodiment, the secure priority identity decision mechanism may be implemented by the IP ip[n6] in cooperation of the preceding IP(s) and related link(s), so the IP ip[n6] may select its own access identity at step 303/307 without intervention of the secure CPU 230, and regardless of whether and how the non-secure CPU 240 instructs.

Figure 4:
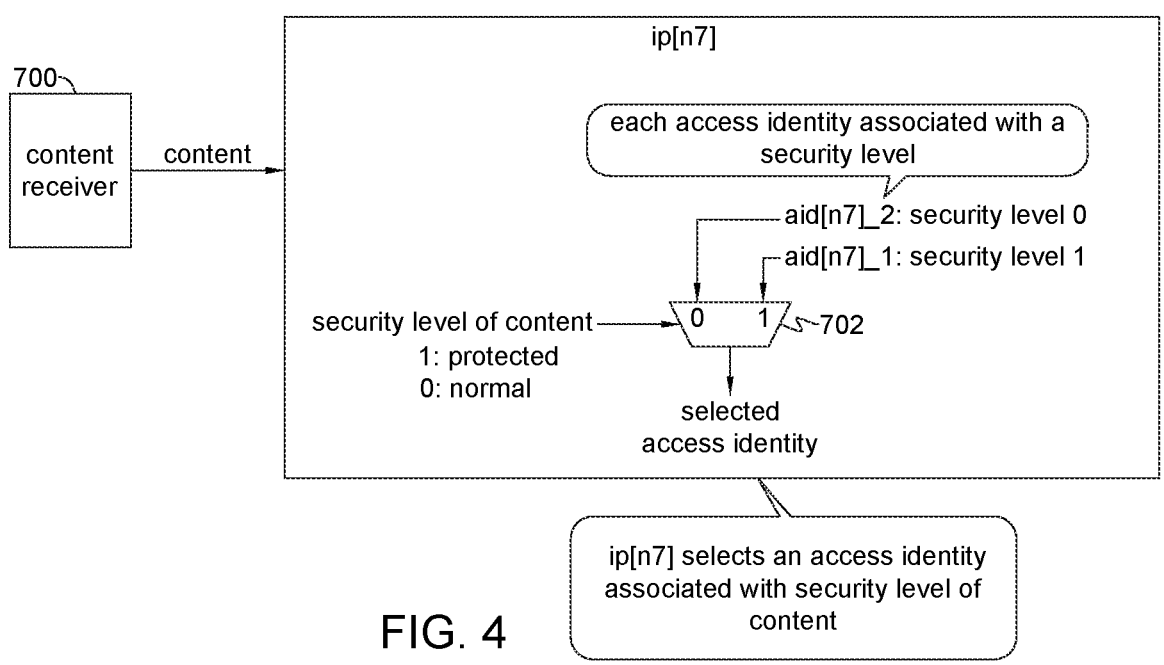

Along with FIGS. 1a and 1b, FIG. 4 depicts an IP ip[n7] according to an embodiment of the invention; the IP ip[n7] may adopt a content-dependent identity decision mechanism. The IP ip[n7] may be associated with multiple access identities aid[n7]_1 to aid[n7]_K, and each access identity aid[n7]_k (for k=1 to K) may be associated with one of a plurality of security levels; for example, an access identity aid[n7]_1 may be associated with a security level 1, and an access identity aid[n7]_2 may be associated with a security level 0. Each content to be processed by the IPs ip[n7] may be associated with one of the plurality of security levels. At step 303, if the first content is associated with a first one of the security levels, the IP ip[n7] may select an access identity that is also associated with the first one of the security levels, Similarly, at step 307, if the second content is associated with a second one of the security levels, the IP ip[n7] may select an access identity that is also associated with the second one of the security levels. In other words, when selecting one of the multiple access identities aid[n7]_1 to aid[n7]_K for processing a content, the IP ip[n7] may select an access identity that is associated with a security level equal to the security level associated with the content.

In an embodiment, the content to be processed by the IP ip[n7] (e.g., the first content and/or the second content) may be provided by a media receiver 700 coupled to the IP ip[n7]. For example, in an embodiment, the media receiver 700 may be an HDMI (high-definition multimedia interface) receiver. The media receiver 700 may analyze whether said content is protected under digital content protection (such as DRM or HDCP, high-bandwidth digital content protection); if the content is protected under digital content protection, the content may be associated with a higher security level; if the content is not protected under digital content protection, the content may be associated with a lower security level. The media receiver 700 may inform the IP ip[n7] about the security level with which the content is associated. As shown in FIG. 4, the IP ip[n7] may implement the content-dependent identity decision mechanism by simple logic circuitry (e.g., a selection multiplexer 702), so the IP ip[n7] may select its own access identity at step 303/307 without intervention of the secure CPU 230, and regardless of whether and how the non-secure CPU 240 instructs.

To sum up, according to the invention, each IP for content processing may have different access identities respectively permissible in different ranges of a memory, and may select and use different ones of the access identities to access the memory when cycling between processing of multiple contents. According to the invention, each IP may adopt its own identity decision mechanism to decide which access identity to use, and the identity decision mechanism may not involve secure CPU, so the IPs may rapidly and frequently switch between different access identities when cycling between processing of multiple contents, and may therefore effectively improve efficiency of protecting multi-content process.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method applied to a system for improving an efficiency of protecting a multi-content process; the system cooperating with a memory, and comprising one or more hardware IPs (intellectual properties) for content processing, wherein:

one of the one or more IPs is associated with multiple access identities;

the memory comprises multiple different ranges; and the method comprises:

configuring range permissions by causing each of the multiple different ranges to permit only one of the multiple access identities to access, with different ones of the multiple different ranges respectively permitting different ones of the multiple access identities to access;

selecting one of the multiple access identities as a first access identity for processing a first content, and using the first access identity when said IP accesses the memory during a processing of a first portion of the first content; and selecting a different one of the multiple access identities as a second access identity for processing a second content, and using the second access identity when said IP accesses the memory during a processing of a first portion of the second content; and after using the first access identity during the processing of the first portion of the first content and before using the second access identity during the processing of the first portion of the second content, not reconfiguring the configured range permissions; and after using the first access identity during the process of the first portion of the first content and using the second access identity during the process of the first portion of the second content, using the first access identity again when said IP accesses the memory during a processing of a second portion of the first content.

2. The method of claim 1 further comprising:
when selecting one of the multiple access identities, determining which one to select by a non-secure CPU.

3. The method of claim 1, wherein configuring the range permission is executed by a secure CPU.

4. The method of claim 1, wherein:
the one or more IPs further include a preceding IP coupled to said IP;
the preceding IP is associated with a plurality of preceding-IP access identities, and is arranged to select one of the plurality of preceding-IP access identities;
each said access identity is bound to one of the plurality of preceding-IP access identities; and
the method further comprises:
when selecting one of the multiple access identities, selecting a said access identity that is bound to the selected preceding-IP access identity.

5. The method of claim 4, wherein selecting the said access identity that is bound to the selected preceding-IP access identity is performed without intervention of a secure CPU, and regardless of whether and how a non-secure CPU instructs.

6. The method of claim 1, wherein:
the one or more IPs further include a succeeding IP coupled to said IP; and the method further comprises:
when one of the multiple access identities is selected, propagating the selected access identity to the succeeding IP, and using the selected access identity when the succeeding IP accesses the memory.

7. The method of claim 1, wherein:
the one or more IPs further include a plurality of preceding IPs coupled to said IP;

each said access identity is associated with one of a plurality of security levels;

each said preceding IP is associated with a plurality of corresponding access identities, and is arranged to select one of the plurality of corresponding access identities; each said corresponding access identity is associated with one of the plurality of security levels; and the method further comprises:
when selecting one of the multiple access identities, selecting a said access identity according to the security levels associated with the selected corresponding access identities of the plurality of preceding IPs.

8. The method of claim 1, wherein:
the one or more IPs further include a plurality of preceding IPs coupled to said IP;
each said access identity is associated with one of a plurality security levels;
each said preceding IP is associated with multiple corresponding access identities, and is arranged to select one of the multiple corresponding access identities; each said corresponding access identity is associated with one of the plurality of security levels; and
the method further comprises:
when selecting one of the multiple access identities, applying a predefined rule to the security levels associated with the selected corresponding access identities of the plurality of preceding IPs to evaluate a resultant security level, and
selecting a said access identity that is associated with the resultant security level.

9. The method of claim 1, wherein:
each said access identity is associated with one of a plurality of security levels;
the first content is associated with one of the plurality of security levels; and
the method further comprises:
when selecting one of the multiple access identities for processing the first content, selecting a said access identity according to the security level associated with the first content.

10. A system with improved efficiency of protecting a multi-content process, comprising:
one or more hardware IPs for content processing, a subset of the one or more hardware IPs implementing a secure CPU and a non-secure CPU; wherein:
the system cooperates with a memory which comprises multiple different ranges;
one of the one or more IPs is associated with multiple access identities;
the secure CPU is arranged to configure range permissions by causing each of the multiple different ranges to permit only one of the multiple access identities to access, with different ones of the multiple different ranges respectively permitting different ones of the multiple access identities to access;
said IP is arranged to:
select one of the multiple access identities as a first access identity for processing a first content, and use the first access identity when accessing the memory to process the first content; and
select a different one of the multiple access identities as a second access identity for processing the second content, and use the second access identity when accessing the memory to process the second content; and the secure CPU is further arranged not to reconfigure the configured range permissions after said IP using the first access identity and before said IP uses the second access identity.

11. The system of claim 10, wherein the non-secure CPU is arranged to instruct said IP which one of the multiple access identities to select when said IP selects one of the multiple access identities.

12. The system of claim 10, wherein:
the one or more IPs further include a preceding IP coupled to said IP;
the preceding IP is associated with a plurality of preceding-IP access identities, and is arranged to select one of the plurality of preceding-IP access identities;
each of the multiple access identities is bound to one of the plurality of preceding-IP access identities; and
said IP is further arranged to: when selecting one of the multiple access identities, select a said access identity that is bound to the selected preceding-IP access identity.

13. The system of claim 12, wherein said IP is further arranged to:
when selecting one of the multiple access identities, determine which one to select without intervention of the secure CPU, and regardless of whether and how the non-secure CPU instructs.

14. The system of claim 10 further comprising an internal link, wherein:
the one or more IPs further include a succeeding IP coupled to said IP via the internal link;
the internal link is arranged to: when said IP selects one of the multiple access identities, propagate the selected access identity to the succeeding IP; and
the succeeding IP is arranged to: use the selected access identity when the succeeding IP accesses the memory.

15. The system of claim 10, wherein:
the one or more IPs further include a plurality of preceding IPs coupled to said IP;
each said access identity is associated with one of a plurality of security levels;
each said preceding IP is associated with multiple corresponding access identities, and is arranged to select one of the multiple corresponding access identities; each of the multiple corresponding access identities is associated with one of the plurality of security levels; and
said IP is further arranged to:
when selecting one of the multiple access identities, select a said access identity according to the security levels associated with the selected corresponding access identities of the plurality of preceding IPs.

16. The system of claim 15, wherein said IP is further arranged to:
when selecting one of the multiple access identities, determine which one to select without intervention of the secure CPU, and regardless of whether and how the non-secure CPU instructs.

17. The system of claim 10, wherein:
the one or more IPs further include a plurality of preceding IPs coupled to said IP;
each said access identity is associated with one of a plurality of security levels;
each said preceding IP is associated with a plurality of corresponding access identities, and is arranged to select one of the plurality of corresponding access identities; each of the plurality of corresponding access identities is associated with one of the plurality of security levels; and
said IP is further arranged to:
when selecting one of the multiple access identities, apply a predefined rule to the security levels associated with the selected corresponding access identities of the plurality of preceding IPs to evaluate a resultant security level, and
select a said access identity that is associated with the resultant security level.

18. The system of claim 10, wherein:
each said access identity is associated with one of a plurality of security levels;
the first content is associated with one of the plurality of security levels; and
said IP is further arranged to:
when selecting one of the multiple access identities for processing the first content, select a said access identity that is associated with a said security level equal to the security level associated with the first content.

* * * * *